United States Patent [19]

Martignoni et al.

[11] 4,102,988

[45] Jul. 25, 1978

[54] CYANO COMPOUNDS AS FUELS FOR HF OR DF LASERS

[75] Inventors: Pasquale Martignoni; James A. Murfree, Jr.; William M. Chew; Orval E. Ayers, all of Huntsville, Ala.

[73] Assignee: The United States of America as represented by the Secretary of the Army, Washington, D.C.

[21] Appl. No.: 838,519

[22] Filed: Oct. 3, 1977

[51] Int. Cl.² .............................................. C01B 7/22
[52] U.S. Cl. .............................. 423/483; 331/94.5 G; 423/500
[58] Field of Search ............................... 423/483, 500; 331/94.5 G

[56] References Cited

U.S. PATENT DOCUMENTS 2,981,602  4/1961  Olah et al. ............................ 423/483

OTHER PUBLICATIONS

Technical Report RK-76-11, "Solid Propellants for Generating Hydrogen" by Dr. O. E. Ayers et al., Apr. 20, 1976, p. 13, U.S.A. Missile Command, Ala.

*Primary Examiner*—O. R. Vertiz
*Assistant Examiner*—Wayne A. Langel
*Attorney, Agent, or Firm*—Nathan Edelberg; Robert P. Gibson; Jack W. Voigt

[57] ABSTRACT

A cyano compound fuel selected from the group consisting of dicyanoacetylene (DCA), tetracyanoethylene (TCE), and tetracyanoethylene oxide (TCEO) when reacted with an oxidizer compound selected from the group consisting of fluorine ($F_2$), nitrogen trifluoride ($NF_3$), chlorine trifluoride ($ClF_3$), chlorine pentafluoride ($ClF_5$), and tetrafluorohydrazine ($N_2F_4$) produces the F· atom concentration required for either HF or DF lasers. The reaction is accomplished in the presence of a diluent gas selected from nitrogen and helium. No deactivation species are among the gaseous species produced which include $CF_4$, F· atoms, and $N_2$; therefore, deactivation of the excited molecules, either HF or DF, which are responsible for the lasing in a HF or DF laser is prevented. A higher performance of the laser device can be achieved.

6 Claims, 1 Drawing Figure

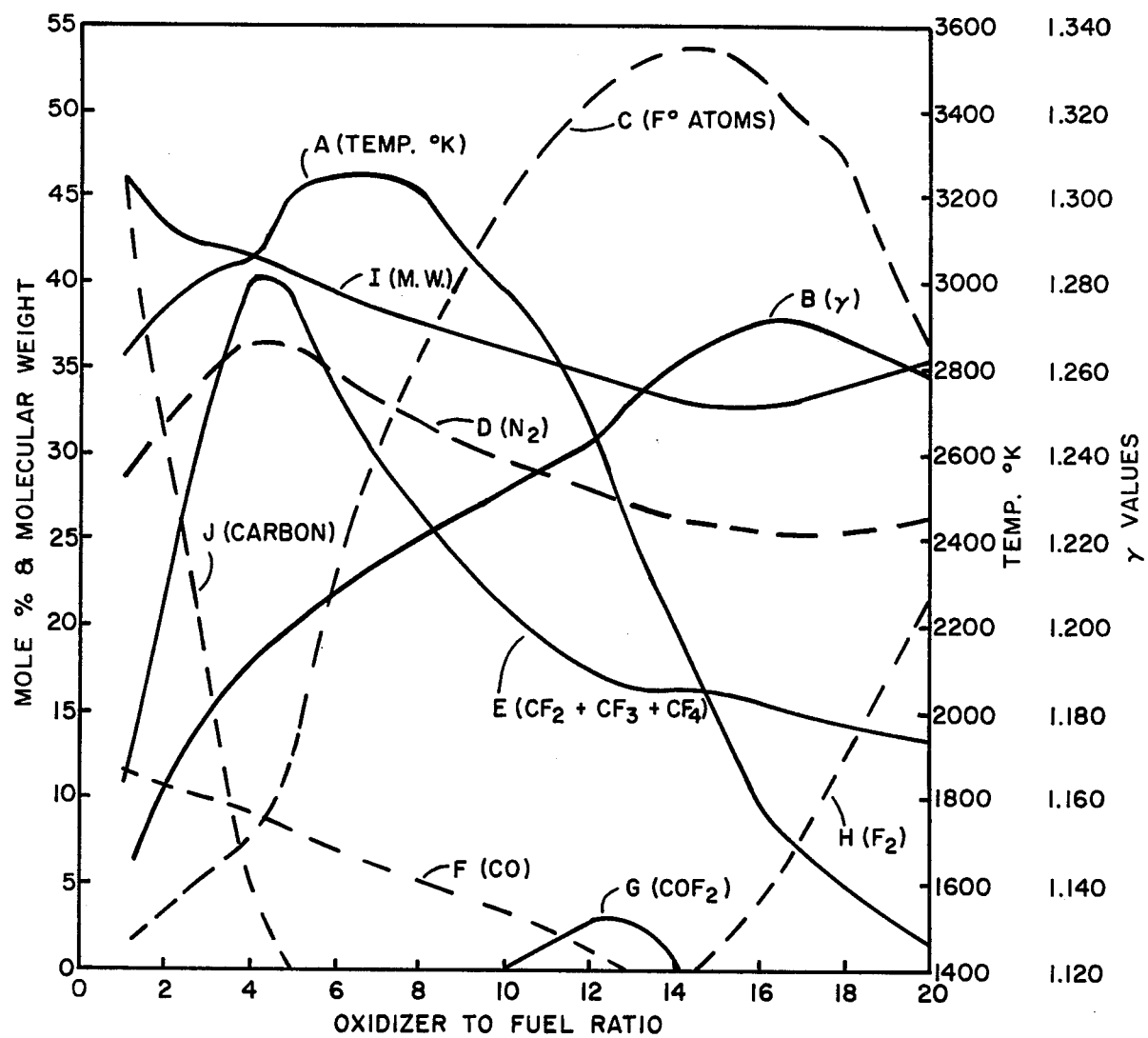

CYANO COMPOUNDS AS FUELS FOR HF OR DF LASERS

DEDICATORY CLAUSE

The invention described herein may be manufactured, used, and licensed by or for the Government for governmental purposes without the payment to us of any royalties thereon.

BACKGROUND OF THE INVENTION

The standard procedure for producing hydrogen fluoride (HF) or deuterium fluoride (DF) lasers is to produce fluorine atoms (F·) by reacting hydrogen ($H_2$) with excess fluorine ($F_2$) in a combustor and then to expand the gases diluted with helium (He) through supersonic nozzles into the laser optical cavity. In the cavity the F· atoms react with either $H_2$ or $D_2$ to form vibrationally excited HF or DF molecules which produce lasing.

The present reactants are either very toxic and corrosive ($F_2$) or constitute explosion hazards ($H_2$). Furthermore, the present reactants require significant handling problems because of their cryogenic nature.

A considerable amount of study and experimentation is presently being undertaken in order to replace the present laser reactants with alternate sources which are non-cryogenic, more easily handled, and more easily adaptable to mobile systems as required by the Army for their potential chemical laser applications.

Furthermore, the possible new reactants should not produce, upon reacting, any combustion species which are known to be strong deactivators for any of the excited molecules, either HF or DF, which are responsible for the lasing. Thus, the HF produced in the combustor when $H_2$ and $F_2$ are reacted serves as a moderate deactivator for any excited DF produced in the laser cavity. This will result in a lower performance of the laser device.

Therefore, an object of this invention is to provide compounds as alternate replacements for hydrogen as a fuel in the production of F· atoms for use in an HF or DF laser.

Another object of this invention is to provide solid and/or liquid fuel compounds as alternate replacements for hydrogen as a fuel in the production of F· atoms.

A further object of this invention is to provide a method employing solid and/or liquid fuel compounds as alternate replacements for hydrogen as a fuel in the production of F· atoms.

Still a further object of this invention is to provide a method employing solid and/or liquid fuel compounds as alternate replacements for hydrogen as a fuel in the production of F· atoms thus obviating the need for some of the bulky pressurized or cryogenic cylinders presently required for HF or DF lasers employing stored hydrogen as a fuel.

SUMMARY OF THE INVENTION

A cyano compound selected from the group consisting of dicyanoacetylene (DCA), tetracyanoethylene (TCE), and tetracyanoethylene oxide (TCEO) is employed as a replacement for hydrogen as a fuel in the production of F· atoms from the reaction wherein the selected cyano compound is reacted in the presence of a diluent gas with a compound selected from the group consisting of fluorine, nitrogen trifluoride, chlorine trifluoride, chlorine pentafluoride, and tetrafluorohydrazine.

The cyano compounds are further identified as follows:

DCA = NC—C≡C—CN, = $C_4N_2$ = dicyanoacetylene

MP = 294° K

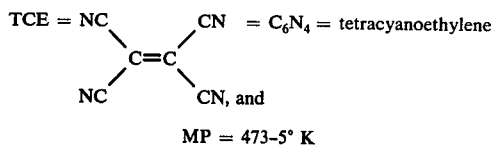

TCE = tetracyanoethylene

MP = 473-5° K

TCEO = tetracyanoethylene oxide

MP = 450° K

Representative of the reaction method of this invention is the reaction using $C_6N_4$, He, and $NF_3$ in a predetermined mole ratio of 1:30:14 which results in the production of all gaseous species which included tetrafluoromethane ($CF_4$), F· atoms, and $N_2$ at a temperature of 1923° K. The helium is employed as a diluent gas. The average molecular weight of the products was 19.8. This average molecular weight is in the preferred range for use in a laser cavity since deactivation reactions or other reactions which effect laser power are at a minimum.

BRIEF DESCRIPTION OF THE DRAWING

The FIGURE of the drawing is a plotting which depicts theoretical thermodynamic combustion properties for the combination of tetracyanoethylene oxide as fuel and nitrogen trifluoride as oxidizer wherein the reaction conditions and the predetermined ratio of oxidizer to fuel can be selected for producing the preferred mole percent of F· atoms for use as a laser fuel.

DESCRIPTION OF THE PREFERRED EMBODIMENT

A fuel selected from the group consisting of dicyanoacetylene (DCA), tetracyanoethylene (TCE), and tetracyanoethylene oxide (TCEO) and an oxidizer selected from the group consisting of fluorine ($F_2$), nitrogen trifluoride ($NF_3$), chlorine trifluoride ($ClF_3$), chlorine pentafluoride ($ClF_5$), and tetrafluorohydrazine ($N_2F_4$) are reacted under a predetermined pressure in the range of several atmospheres (e.g., 10) and in the presence of the diluent gas helium and in a preferred ratio of oxidizer to fuel to produce F· atoms for use as a laser fuel.

In further reference to the FIGURE of the drawing, the values of the ratio of oxidizer to fuel are shown on the abscissa, the temperatures of combustion in ° K and gamma values (e.g. $\gamma = (C_p/C_v)$, wherein $C_p$ = heat capacity at constant pressure and $C_v$ = heat capacity at constant volume) are shown on the right ordinate scale, the mole percent and the molecular weight values are shown on the left ordinate scale.

The curves of the drawing are based on theoretical thermodynamic combustion properties for the fuel, tetracyanoethylene oxide, and the oxidizer, nitrogen trifluoride. A similar relationship would be applicable to other oxidizers and fuels of this invention. Thus, curves A–J result from plotting the unit values of the identities below in Table I for the pertinent units and values shown on the right and left ordinate scale and the abscissa scale. Curve A depicts temperature ° K for various oxidizer to fuel ratios. Curve B depicts gamma values for various oxidizer to fuel ratios. Other curves and their relationships will be discussed further hereinbelow.

TABLE I

| Curve Identity | Right Ordinate Scale Scale Range, Unit | Left Ordinate Scale Scale Range, Unit | Abscissa Scale Scale Range, |
|---|---|---|---|
| A | 1400–3200, ° K | | 0–20, O/F* |
| B | 1.130, γ | | 0–20, O/F |
| C | | 0–55, Mole Percent | 0–20, O/F |
| D | | 0–55, Mole Percent | 0–20, O/F |
| E | | 0–55, Mole Percent | 0–20, O/F |
| F | | 0–55, Mole Percent | 0–20, O/F |
| G | | 0–55, Mole Percent | 0–20, O/F |
| H | | 0–55, Mole Percent | 0–20, O/F |
| I | | 0–55, Mole Percent | 0–20, O/F |
| J | | 0–55, Mole Percent | 0–20, O/F |

*O/F - oxidizer to fuel ratio

By inspection of the curves one can select conditions to avoid or conditions for a preferred mode of operation. The final temperatures and concentrations can be adjusted by adding a diluent gas at the predetermined temperature and pressures required in the laser cavity into which the fluorine atoms and reaction products are injected for reaction with $H_2$ or $D_2$ to produce lasing.

By inspection of the curves of the FIGURE of the drawing, it is shown that an O/F ratio from about 6 to 1 to about 14 to 1 for the oxidizer, $NF_3$, reacting with fuel, tetracyanoethylene oxide yields products under conditions which are preferred. For example, the presence of unburned carbon shown by curve J indicates that the oxidizer to fuel ratio is too low (i.e., an O/F range from about 1/1 to about 5/1). Likewise, when the O/F ratio approaches from about 15/1 to about 20/1 the $F_2$ molecule starts appearing in reaction products as shown by curve H. This is undesirable since the $F_2$ molecules serve as deactivation species. The F· atoms as shown by curve C are present in sufficient quantity when the O/F ratio is in the preferred range to permit additional diluent, helium, addition as required to adjust temperature to a tolerable range for equipment materials and supply lines of laser equipment.

The curve D shows the $N_2$ concentration which also serves as diluent gas, in addition to the diluent helium. Curve E shows the combined total of species of reactant products of which $CF_2$, $CF_3$, and $CF_4$ constitute the majority that are present. Other species which are present include carbon monoxide (CO) as shown by curve F and carbonyl difluoride ($COF_2$) as shown by curve G. Since the molecular weight average values for the reactants effect the laser performance the values for average molecular weights are shown by curve I. The average molecular weight range can be lowered to the desired range by addition of helium diluent.

The primary objective of reacting the fuels and oxidizers of this invention is to yield activated F· atoms for discharging into a laser cavity to combine with hydrogen or deuterium from another source to yield HF or DF in a high energy state to thereafter lase. The pressure conditions required for lasing and maintaining conditions favorable for lasing can be obtained by either mechanical pumping or chemical pumping. The mechanical pumping would include a suitable vacuum chamber into which the reactant species from the laser cavity can be discharged. A suitable procedure for using the F· atoms as generated by the method of this invention includes opening the valves to admit the reactants into the laser cavity with which the mechanical or chemical pumping means are in communication. Normally, the large capacity mechanical pumping has been employed to obtain the desired vacuum, then the mechanical pumping is shut off. In the chemical pumping system a material that is reactive with the gases being discharged from the laser cavity effectively removes the gaseous species by forming a solid product to thereby maintain the reduced pressure conditions for continued operation. When employing a chemical pumping procedure, nitrogen is required as the diluent gas since the chemical pump is not capable of pumping inert gases such as helium. However, some nitrogen is already present in the reaction products when the method is employed in accordance with this invention.

A typical prior art combustor has employed $F_2$ as the oxidizer, ethylene ($C_2H_4$) and deuterium as the fuels and helium as the diluent gas. Table II below lists the summary values for a test which resulted in a peak power output of about 8.47 Kilowatts. The times listed indicates seconds after the pertinent valves to the system were opened. The mass flow is noted in grams per second.

TABLE II

| Time (seconds) | 5.00 | 6.00 | 7.00 | 8.00 |
|---|---|---|---|---|
| Oxidizer ($F_2$, gm/sec) | 22.554 | 23.075 | 23.133 | 23.028 |
| Helium (in $F_2$, gm/sec) | 7.324 | 7.322 | 7.344 | 7.362 |
| Fuel ($C_2H_4$, gm/sec) | 1.851 | 1.852 | 1.851 | 1.852 |
| Helium (in $C_2H_4$, gm/sec) | 2.088 | 2.097 | 7.102 | 7.100 |
| Fuel: ($D_2$, cavity fuel for DF laser) ($H_2$, cavity fuel for HF laser) | | | | |
| $F_2$ (moles/sec) available | .198 | .211 | .213 | .210 |
| O/F (oxidizer/fuel ratio) | 8.994 | 9.197 | 9.223 | 9.179 |

The above test data resulted from an experiment employing pressurized cylinders for the fuels, oxidizer, and diluent. This data closely agreed with the calculated theoretical thermodynamic combustion properties with the exception that the value of F· cannot be measured but is calculated as $F_2$ (moles/sec) available. The preferred procedure is to narrow the variable conditions by computer calculations prior to actual test runs. Many of the thermodynamic properties of rocket propellants have been determined by earlier investigations and evaluations. These earlier investigations and evaluations, including the computer calculations, have now become very useful in the laser art which is being rapidly developed. An extensive evaluation of prototype propellant combinations including dicyanoacetylene (DCA), $C_4N_2$, is compiled in a publication titled: "Thermodynamics of Rocket Propulsion and Theoretical Evaluation of Some Prototype Propellant Combinations," WADC-TR-59-757 by Thomas E. Dobbins (December 1959), Wright Patterson Air Force Base.

Tables III, IV, and V below set forth theoretical thermodynamic combustion properties for the systems identified therewith. The values, particularly, concentrations, molecular weights, and temperatures can be adjusted for use with a particular laser system by adjustment of the diluent gas (helium).

TABLE III

Thermodynamic Properties and Mole Fractions for Dicyanoacetylene ($C_4N_2$), Helium, and Chlorine Pentafluoride

| | Calculations 1 | Calculations 2 |
|---|---|---|
| P, Atm | 10.00 | 10.00 |
| T, °K | 2021 | 1792 |
| Gamma (γ) | 1.2575 | 1.3090 |
| M, Mol Wt | 16.031 | 17.235 |
| $C_4N_2$ (fuel), moles | 1.000 | 1.000 |
| Helium (diluent), moles | 40.000 | 40.000 |
| $ClF_5$ (oxidizer), moles | 5.000 | 6.000 |
| Major Products (Mole Fractions) | | |
| $CF_4$ | .07218 | .06767 |
| Cl | .01992 | .00340 |
| ClF | .05814 | .09566 |
| $Cl_2$ | .00609 | .00122 |
| F· | .10340 | .13581 |
| $F_2$ | .00043 | .00268 |
| He | .72180 | .67665 |
| $N_2$ | .01804 | .01692 |

TABLE IV

Thermodynamic Properties and Mole Fractions for Tetracyanoethylene ($C_6N_4$), Helium, and Chlorine Pentafluoride

| | Calculations 1 | Calculations 2 |
|---|---|---|
| P, Atm | 10.00 | 10.00 |
| T, °K | 2265 | 2009 |
| Gamma (γ) | 1.2444 | 1.2459 |
| M, Mol Wt | 19.073 | 18.109 |
| $C_6N_4$ (fuel), moles | 1.000 | 1.000 |
| Helium (diluent), moles | 40.000 | 50.000 |
| $ClF_5$ (oxidizer), moles | 7.000 | 8.000 |
| Major Products (Mole Fractions) | | |
| $CF_3$ | .0001 | |
| $CF_4$ | .09525 | .07920 |
| Cl | .05455 | .01828 |
| ClF | .03871 | .07606 |
| $Cl_2$ | .00894 | .00564 |
| F· | .13545 | .13361 |
| $F_2$ | .00025 | .00077 |
| He | .63508 | .66004 |
| $N_2$ | .03175 | .02640 |

TABLE V

Thermodynamic Properties and Mole Fractions for Tetracyanoethylene Oxide ($C_6N_4O$), Helium, and Chlorine Pentafluoride

| | Calculations 1 | Calculations 2 |
|---|---|---|
| P, Atm | 10.00 | 10.00 |
| T, °K | 1965 | 1997 |
| Gamma (γ) | 1.2241 | 1.2247 |
| M, Mol Wt | 18.223 | 15.783 |
| $C_6N_4$ (fuel), moles | 1.000 | 1.000 |
| Helium (diluent), moles | 50.000 | 60.000 |
| $ClF_5$ (oxidizer), moles | 8.000 | 7.000 |
| Major Products (Mole Fractions) | | |
| $CF_4$ | .07608 | .06690 |
| $COF_2$ | .00269 | .00599 |
| $CO_2$ | .00002 | .00010 |
| Cl | .01403 | .01799 |
| ClF | .08167 | .05522 |
| ClO | .00005 | .00005 |
| $Cl_2$ | .00465 | .00595 |
| F· | .13187 | .09020 |
| FO | .00001 | .00001 |
| $F_2$ | .00094 | .00037 |
| He | .65656 | .72993 |
| NO | .00021 | .00016 |
| NOF | .00012 | .00005 |
| $N_2$ | .02610 | .02422 |
| O | .00001 | .00001 |
| $O_2$ | .00500 | .00284 |

Calculations show that no appreciable deactivation species are present in the products from the reaction of the cyano compounds and the oxidizers of this invention. Further calculations show that all of the species produced are gases.

The advantage of reacting the specified cyano compound fuels with the oxidizers specified to produce F· atoms, as contrasted with the prior art method to produce F· atoms by reacting hydrogen with excess fluorine in a combustor and then expand the gases diluted with helium through supersonic nozzles into the laser optical cavity, is that all species produced under the preferred oxidizer to fuel ratio concentration are gases of a preferred molecular weight range with results in minimum effect to laser operations. Since the cyano compound fuels, TCE and TCEO, are solids with melting points of 473–5° K and 450° K respectively, these compounds could be easily pelletized for a particular application if required or they could be inserted into canisters into which the desired ratio of oxidizer and diluent gas could be added.

The disclosed cyano compound fuels are reacted with the disclosed oxidizer compounds in accordance with this invention to produce F· atom for discharge into a laser cavity as a reactant to produce lasing from HF or DF formed. Since the objective of using the cyano compound is to provide alternate non-cryogenic sources to generate F· atoms, then it follows that non-cryogenic sources of hydrogen or deuterium would be preferred for supplying the other reactant for the HF or DF laser. Non-cryogenic sources of hydrogen and deuterium are disclosed in our copending applications: "Solid Propellants for Generating Hydrogen," Ser. No. 669,064, filed Mar. 22, 1976, now U.S. Pat. No. 4,061,512, and the Division Application thereof: "Method for Producing Hydrogen or Deuterium from Storable Solid Propellant Compositions Based on Metal Boron Compounds," Ser. No. 741,590, filed Nov. 15, 1976, now U.S. Pat. No. 4,064,225.

Thus, the hydrogen or deuterium generated from the non-cryogenic sources could be reacted with the F· atoms in a laser cavity to produce lasing. The discharged products of the combustor to produce F· atoms could be combined with the effluent from the hydrogen generator and subsequently directed through a laser cavity for lasing. Since the hydrogen or deuterium from the non-cryogenic source is hot (240° C–650° C), although cooler than the combustion products and F· atoms, it would serve to reduce the temperature of the combination to a level which may be required for a particular laser cavity.

The method of this invention could also be used in combination with hydrogen or deuterium from a pressurized or a cryogenic source. The hydrogen or deuterium could be introduced into the combustor for generating F· atoms or could be combined with the discharged products of the combustor for producing F· atoms and subsequently directed through a laser cavity for lasing.

We claim:

1. A method of forming vibrationally excited HF or DF molecules which produces lasing, said method comprising:
   (i) providing a predetermined molar quantity of a cyano compound fuel selected from the group consisting of dicyanoacetylene, tetracyanoethylene, and tetracyanoethylene oxide and a predetermined molar quantity of an oxidizer compound dispersed in a predetermined molar quantity of a diluent gas selected from the group consisting of helium and nitrogen, said oxidizer selected from the group consisting of fluorine, nitrogen trifluoride, chlorine trifluoride, chlorine pentafluoride, and tetrafluorohydrazine;

(ii) reacting under a predetermined pressure in the range of several atmospheres said cyano compound fuel with said oxidizer in a combustor wherein the oxidizer to fuel ratio is maintained from about 6 to 1 about 14 to 1 by adjusting said predetermined molar ratio of said oxidizer, said fuel, and said diluent gas to produce F· atoms, and reacting the F· atoms with hydrogen or deuterium to form vibrationally excited HF or DF molecules which produces lasing.

2. The method of claim 1 wherein said cyano compound fuel selected is dicyanoacetylene, said oxidizer compound selected is chlorine pentafluoride, said diluent gas selected is helium, and wherein said reacting is accomplished under a predetermined pressure of about 10 atmospheres, said predetermined molar quantity of said dicyanoacetylene is about 1, said predetermined molar quantity of said diluent gas helium is about 40, and said predetermined molar quantity of said chlorine pentafluoride is about 6.

3. The method of claim 1 wherein said cyano compound fuel selected is tetracyanoethylene, said oxidizer compound selected is chlorine pentafluoride, said diluent gas selected is helium, and wherein said reacting is accomplished under a predetermined pressure of about 10 atmospheres, said predetermined molar quantity of said tetracyanoethylene is about 1, said predetermined molar quantity of said diluent gas helium is about 50, and said predetermined molar quantity of said chlorine pentafluoride is about 8.

4. The method of claim 1 wherein said cyano compound fuel selected is tetracyanoethylene oxide, said oxidizer compound selected is chlorine pentafluoride, said diluent gas selected is helium and herein said reacting is accomplished under a predetermined pressure of about 10 atmospheres, said predetermined molar quantity of said tetracyanoethylene oxide is about 1, said predetermined molar quantity of said diluent gas helium is about 50, and said predetermined molar quantity of said chlorine pentafluoride is about 8.

5. The method of claim 1 wherein said cyano compound fuel selected is tetracyanoethylene oxide, said oxidizer compound selected is chlorine pentafluoride, said diluent gas selected is helium, and wherein said reacting is accomplished under a predetermined pressure of about 10 atmospheres, said predetermined molar quantity of said tetracyanoethylene oxide is about 1, said predetermined molar quantity of said diluent gas helium is about 60, and said predetermined molar quantity of said pentafluoride is about 7.

6. The method of claim 1 wherein said cyano compound fuel selected is tetracyanoethylene, said oxidizer compound selected is nitrogen trifluoride, said diluent gas selected is helium, and wherein said reacting is accomplished under a predetermined pressure of about 10 atmospheres, said predetermined molar quantity of said tetracyanoethylene is about 1, said predetermined molar quantity of said diluent gas helium is about 30, and said predetermined molar quantity of said nitrogen trifluoride is about 14.

* * * * *